US012480077B2

(12) United States Patent
Koga

(10) Patent No.: US 12,480,077 B2
(45) Date of Patent: Nov. 25, 2025

(54) AQUEOUS CLEANING LIQUID AND METHOD OF CLEANING ELECTRONIC DEVICE

(71) Applicant: TOKYO OHKA KOGYO CO., LTD., Kawasaki (JP)

(72) Inventor: Shinya Koga, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 307 days.

(21) Appl. No.: 18/470,305

(22) Filed: Sep. 19, 2023

(65) Prior Publication Data

US 2024/0101936 A1 Mar. 28, 2024

(30) Foreign Application Priority Data

Sep. 27, 2022 (JP) ................................ 2022-153459

(51) Int. Cl.
*C11D 7/00* (2006.01)
*C11D 7/08* (2006.01)
*C11D 7/36* (2006.01)

(52) U.S. Cl.
CPC .................. *C11D 7/08* (2013.01); *C11D 7/36* (2013.01); *C11D 2111/22* (2024.01)

(58) Field of Classification Search
CPC ......... C11D 7/08; C11D 7/36; C11D 2111/22; C11D 3/361; H01L 21/02041
USPC ........................................ 510/175, 303, 405
See application file for complete search history.

(56) References Cited

U.S. PATENT DOCUMENTS

| | | | | |
|---|---|---|---|---|
| 8,969,276 | B2 * | 3/2015 | Braun .................. | H10F 77/703 252/79.3 |
| 2015/0140820 | A1 * | 5/2015 | Kawada .................. | C11D 7/36 438/692 |
| 2019/0092974 | A1 * | 3/2019 | Tseng ................ | H01L 21/31053 |
| 2021/0147768 | A1 | 5/2021 | Oie et al. | |
| 2023/0002676 | A1 | 1/2023 | Sugishima | |

FOREIGN PATENT DOCUMENTS

| | | | | | |
|---|---|---|---|---|---|
| TW | 1375263 | B | * 10/2012 | .............. | C11D 3/37 |
| WO | WO 2019208684 | A1 | * 10/2019 | .............. | C11D 7/08 |
| WO | WO 2021/176952 | A1 | 9/2021 | | |

* cited by examiner

*Primary Examiner* — Eisa B Elhilo
(74) *Attorney, Agent, or Firm* — KNOBBE, MARTENS, OLSON & BEAR, LLP

(57) ABSTRACT

An aqueous cleaning liquid including hydrofluoric acid and tetradecylphosphonic acid, and a method of cleaning an electronic device, contacting the electronic device with the aqueous cleaning liquid.

4 Claims, No Drawings

AQUEOUS CLEANING LIQUID AND METHOD OF CLEANING ELECTRONIC DEVICE

BACKGROUND OF THE INVENTION

Field of the Invention

The present invention relates to an aqueous cleaning liquid and a method of cleaning an electronic device.

Priority is claimed on Japanese Patent Application No. 2022-153459, filed on Sep. 27, 2022, the content of which is incorporated herein by reference.

Description of Related Art

In the process of manufacturing electronic devices such as semiconductor devices, a dry etching step is typically employed in a case of forming a semiconductor integrated circuit. In this dry etching step, dry etching residues (zirconium-based residues, titanium-based residues, polymer residues, and the like) are generated and thus required to be removed. It is preferable that a cleaning agent for removing such dry etching residues does not adversely affect (for example, erosion) a metal material for wiring (such as copper, titanium, cobalt, or tungsten) used for a semiconductor integrated circuit to be cleaned.

For example, Patent Document 1 discloses an aqueous composition containing: 0.0001% to 10% by mass of (A) one or more compounds selected from C4 to C13 alkyl phosphonic acid, C4 to C13 alkyl phosphonic acid ester, C4 to C13 alkyl phosphoric acid, and salts thereof with respect to the total amount of the composition; and 0.0001% to 50% by mass of (B) acids or salts thereof other than the C4 to C13 alkyl phosphonic acid, the C4 to C13 alkyl phosphonic acid ester, and the C4 to C13 alkyl phosphoric acid with respect to the total amount of the composition. Further, it is also described that the aqueous composition containing hydrofluoric acid has cleaning properties such as dry etching residue removal properties.

CITATION LIST

Patent Document

[Patent Document 1] PCT International Publication No. WO2019/208684

SUMMARY OF THE INVENTION

There are various metal materials for wiring used in electronic devices and various masking materials used in a case of dry etching, and thus various combinations thereof are present. Therefore, from the viewpoint of an anticorrosion effect on a metal material for wiring, there is a demand for development of a new cleaning composition.

The present invention has been made in consideration of the above-described circumstances, and an object of the present invention is to provide an aqueous cleaning liquid with satisfactory anticorrosion properties, and a method of cleaning an electronic device using the aqueous cleaning liquid.

In order to achieve the above-described object, the present invention employs the following configuration.

(1) An aqueous cleaning liquid including: hydrofluoric acid; and tetradecylphosphonic acid.

(2) The aqueous cleaning liquid according to (1), in which the aqueous cleaning liquid has a pH of 4 to 7.

(3) The aqueous cleaning liquid according to (1) or (2), in which a content of the tetradecylphosphonic acid is ppm or less with respect to a total amount of the aqueous cleaning liquid.

(4) A method of cleaning an electronic device, including: a step of bringing the aqueous cleaning liquid according to any one of (1) to (3) into contact with an electronic device.

According to the present invention, it is possible to provide an aqueous cleaning liquid with satisfactory anticorrosion properties, and a method of cleaning an electronic device using the aqueous cleaning liquid.

DETAILED DESCRIPTION OF THE INVENTION (Cleaning Liquid)

An aqueous cleaning liquid according to a first aspect of the present invention contains hydrofluoric acid and tetradecylphosphonic acid. The content of each component in the aqueous cleaning liquid denotes the concentration of the component in a case of using the liquid for cleaning an electronic device. Each component may be prepared at the concentration in advance, or a concentrated product in a distribution and supply form may be diluted to the concentration in a case of using the liquid for cleaning an electronic device and used.

<Hydrofluoric Acid>

In the present embodiment, the content of the hydrofluoric acid is not particularly limited, but is preferably 50 ppm or greater, more preferably 100 ppm or greater, and still more preferably 300 ppm or greater with respect to the total amount of the aqueous cleaning liquid. The upper limit thereof is not particularly limited, and is, for example, 3,000 ppm or less and preferably 2,000 ppm or less in a case of being used for the cleaning liquid.

In a case where the content of hydrofluoric acid is in the above-described preferable ranges, the cleaning properties are likely to be enhanced.

The mass ratio between the tetradecylphosphonic acid and the hydrofluoric acid may be adjusted to be in a range of 5 to 3,000 by setting the mass of the tetradecylphosphonic acid to 1, preferably in a range of 10 to 2,000, and more preferably in a range of 300 to 1,800 from the viewpoint of anticorrosion properties.

<Tetradecylphosphonic Acid>

In the present embodiment, the content of the tetradecylphosphonic acid is not particularly limited, but is preferably ppm or less, more preferably 10 ppm or less, and still more preferably 7 ppm or less with respect to the total amount of the aqueous cleaning liquid. The lower limit value thereof is, for example, 0.01 ppm or greater, preferably 0.05 ppm or greater, and more preferably 0.1 ppm or greater.

In a case where the content of the tetradecylphosphonic acid is less than or equal to the upper limit value of the above-described preferable ranges, the tetradecylphosphonic acid is easily dissolved in the aqueous cleaning liquid, the aging stability of the aqueous cleaning liquid is likely to be enhanced, and the anticorrosion properties are likely to be enhanced.

<Water>

The aqueous cleaning liquid according to the present embodiment contains water as a diluent. In the present embodiment, water is not particularly limited, but water obtained by performing distillation, an ion exchange treatment, a filter treatment, various adsorption treatments, and the like to remove metal ions, organic impurities, particles, and the like is preferable, and pure water or ultrapure water is particularly preferable.

The content of water is typically in a range of 40% to 99.9998% by mass and preferably in a range of 89.5% to 99.998% by mass with respect to the total amount of the aqueous cleaning liquid.

The aqueous cleaning liquid according to the present embodiment may contain optional components in addition to the hydrofluoric acid and the tetradecylphosphonic acid. Examples of the optional components include acids other than hydrofluoric acid and tetradecylphosphonic acid, anticorrosion agents, surfactants, pH adjusting agents, buffers, and organic solvents.

<<Acids Other than Hydrofluoric Acid and Tetradecylphosphonic Acid>>

The aqueous cleaning liquid according to the present embodiment may contain acids (hereinafter, also simply referred to as “other acids”) other than the hydrofluoric acid and the tetradecylphosphonic acid.

Inorganic acids or organic acids may be used as the other acids.

Examples of the inorganic acids include nitric acid, sulfuric acid, hydrochloric acid, and phosphoric acid.

Examples of the organic acids include an aliphatic carboxylic acid having 1 to 18 carbon atoms, an aromatic carboxylic acid having 6 to 10 carbon atoms, and an amino acid having 1 to 10 carbon atoms.

Preferred examples of the aliphatic carboxylic acids having 1 to 18 carbon atoms include formic acid, acetic acid, propionic acid, lactic acid, glycolic acid, diglycolic acid, pyruvic acid, malonic acid, butyric acid, hydroxybutyric acid, tartaric acid, succinic acid, malic acid, maleic acid, fumaric acid, valeric acid, glutaric acid, itaconic acid, adipic acid, caproic acid, citric acid, propanetricarboxylic acid, trans-aconitic acid, enantoic acid, caprylic acid, lauric acid, myristic acid, palmitic acid, stearic acid, oleic acid, linoleic acid, and linolenic acid.

Preferred examples of the aromatic carboxylic acid having 6 to 10 carbon atoms include benzoic acid, salicylic acid, mandelic acid, phthalic acid, isophthalic acid, and terephthalic acid.

Preferred examples of the amino acid having 1 to 10 carbon atoms include carbamic acid, alanine, glycine, asparagine, aspartic acid, sarcosine, serine, glutamine, glutamic acid, 4-aminobutyric acid, iminodibutyric acid, arginine, leucine, isoleucine, and nitrilotriacetic acid.

In a case where the aqueous cleaning liquid according to the present embodiment contains other acids, the content of the other acids is preferably in a range of 0.0001% to 50% by mass, more preferably in a range of 0.0005% to 20% by mass, and still more preferably in a range of 0.001% to 10% by mass with respect to the total amount of the aqueous cleaning liquid.

The aqueous cleaning liquid of the present embodiment may not contain other acids, and may not contain one or more of the compounds described as the specific examples of the other acids.

<<Anticorrosion Agent>>

The aqueous cleaning liquid of the present embodiment may contain an anticorrosion agent.

Examples of the anticorrosion agent include compounds having a nitrogen-containing heterocyclic ring such as a triazole ring, an imidazole ring, a pyridine ring, a phenanthroline ring, a tetrazole ring, a pyrazole ring, a pyrimidine ring, or a purine ring.

Examples of the compound including a triazole ring include triazoles such as 1,2,3-triazole, 1,2,4-triazole, 3-amino-1H-1,2,4-triazole, 1-acetyl-1H-1,2,3-triazolo[4,5-b]pyridine, 1H-1,2,3-triazolo[4,5-b]pyridine, 1,2,4-triazolo[4,3-a]pyridin-3(2H)-one, and 3H-1,2,3-triazolo[4,5-b]pyridin-3-ol; and benzotriazoles such as 1,2,3-benzotriazole, 5-methyl-1H-benzotriazole, 1-hydroxybenzotriazole, 1-dihydroxypropylbenzotriazole, 2,3-dicarboxypropylbenzotriazole, 4-hydroxybenzotriazole, 4-carboxyl-1H-benzotriazole, 4-carboxyl-1H-benzotriazole methyl ester, 4-carboxyl-1H-benzotriazole butyl ester, 4-carboxyl-1H-benzotriazole octyl ester, 5-hexylbenzotriazole, [1,2,3-benzotriazolyl-1-methyl][1,2,4-triazolyl-1-methyl][2-ethylhexyl]amine, tolyltriazole, naphthotriazole, bis[(1-benzotriazolyl)methyl]phosphonic acid, and 3-aminotriazole.

Examples of the compound including an imidazole ring include imidazoles such as 2-methylimidazole, 2-ethylimidazole, 2-isopropylimidazole, 2-propylimidazole, 2-butylimidazole, 4-methylimidazole, 2,4-dimethylimidazole, 2-ethyl-4-methylimidazole, 2-undecylimidazole, 2-aminoimidazole, and benzimidazole; and biimidazoles such as 2,2'-biimidazole. Among those, the biimidazoles are preferable, and 2,2'-biimidazole is more preferable.

Examples of the compound including a pyridine ring include pyridines such as 1H-1,2,3-triazolo[4,5-b]pyridine, 1-acetyl-1H-1,2,3-triazolo[4,5-b]pyridine, 3-aminopyridine, 4-aminopyridine, 3-hydroxypyridine, 4-hydroxypyridine, 2-acetamidopyridine, 4-pyrrolidinopyridine, 2-cyanopyridine, 2,6-pyridinecarboxylic acid, and 2,4,6-trimethylpyridine; and bipyridyls such as 2,2'-bipyridyl, 4,4'-dimethyl-2,2'-bipyridyl, 4,4'-di-tert-butyl-2,2'-bipyridyl, 4,4-dinonyl-2,2-bipyridyl, 2,2"-bipyridine-6,6'-dicarboxylic acid, and 4,4'-dimethoxy-2,2'-bipyridyl. Among those, bipyridyls are preferable, and 2,2'-bipyridyl, 4,4'-dimethyl-2,2'-bipyridyl, 4,4'-di-tert-butyl-2,2'-bipyridyl, 4,4-dinonyl-2,2-bipyridyl, 2,2"-bipyridine-6,6'-dicarboxylic acid, and 4,4'-dimethoxy-2,2'-bipyridyl are more preferable.

Examples of the compound including a phenanthroline ring include 1,10-phenanthroline.

Examples of the compound including a tetrazole ring include 1H-tetrazole, 5-amino-1H-tetrazole, 5-methyl-1H-tetrazole, 5-phenyl-1H-tetrazole, and 1-(2-diaminoethyl)-5-mercaptotetrazole.

Examples of the compound including a pyrazole ring include 3,5-dimethylpyrazole, 3-amino-5-methylpyrazole, 4-methylpyrazole, and 3-amino-5-hydroxypyrazole.

Examples of the compound including a pyrimidine ring include pyrimidine, 4-methylpyrimidine, 1,2,4-triazolo[1,5-a]pyrimidine, 1,3,4,6,7,8-hexahydro-2H-pyrimido[1,2-a]pyrimidine, 1,3-diphenyl-pyrimidine-2,4,6-trione, 1,4,5,6-tetrahydropyrimidine, 2,4,5,6-tetraaminopyrimidinesulfate, 2,4,5-trihydroxypyrimidine, 2,4,6-triaminopyrimidine, 2,4,6-trichloropyrimidine, 2,4,6-trimethoxypyrimidine, 2,4,6-triphenylpyrimidine, 2,4-diamino-6-hydroxypyrimidine, 2,4-diaminopyrimidine, 2-acetamidopyrimidine, 2-aminopyrimidine, 2-methyl-5,7-diphenyl-(1,2,4)triazolo(1,5-a)pyrimidine, 2-methylsulfanyl-5,7-diphenyl-(1,2,4)triazolo(1,5-a)pyrimidine, 2-methylsulfanyl-5,7-diphenyl-4,7-dihydro-(1,2,4)triazolo(1,5-a)pyrimidine, and 4-aminopyrazolo[3,4-d]pyrimidine.

Examples of the compound including a purine ring include adenine, guanine, hypoxanthine, xanthine, uric acid, and theophylline.

The anticorrosion agent may be used alone or in combination of two or more kinds thereof.

In a case where the aqueous cleaning liquid of the present embodiment contains the anticorrosion agent, the content of the anticorrosion agent is not particularly limited, but is preferably in a range of 0.0001% to 0.2% by mass (1 to 2,000 ppm), more preferably in a range of 0.0003% to 0.1% by mass (3 to 1,000 ppm), still more preferably in a range of 0.0005% to 0.05% by mass (5 to 500 ppm), and particularly preferably in a range of 0.001% to 0.03% by mass (10 to 300 ppm) with respect to the total mass of the aqueous cleaning liquid.

The aqueous cleaning liquid of the present embodiment may not contain one or more selected from the group consisting of a compound having a triazole ring, a compound having an imidazole ring, a compound having a pyridine ring, a compound having a phenanthroline ring, a compound having a tetrazole ring, a compound having a pyrazole ring, a compound having a pyrimidine ring, and a compound having a purine ring, and may not contain one or more of the compounds described as the specific examples of the anticorrosion agent. The aqueous cleaning liquid of the present embodiment may not contain the anticorrosion agent.

<<Surfactant>>

The aqueous cleaning liquid of the present embodiment may contain a surfactant for the purpose of preventing foaming and adjusting the wettability of the cleaning liquid to a substrate. Examples of the surfactant include a nonionic surfactant, an anionic surfactant, a cationic surfactant, and an amphoteric surfactant.

Examples of the nonionic surfactant include polyalkylene oxide alkylphenyl ether-based surfactants, polyalkylene oxide alkyl ether-based surfactants, block polymer-based surfactants consisting of polyethylene oxide and polypropylene oxide, polyoxyalkylene distyrenated phenyl ether-based surfactants, polyalkylene tribenzylphenyl ether-based surfactants, and acetylene polyalkylene oxide-based surfactants.

Examples of the anionic surfactant include alkylsulfonic acids, alkylbenzenesulfonic acids, alkylnaphthalenesulfonic acids, alkyldiphenyl ether sulfonic acids, fatty acid amidosulfonic acids, polyoxyethylene alkyl ether carboxylic acids, polyoxyethylene alkyl ether acetic acids, polyoxyethylene alkyl ether propionic acids, alkyl phosphonic acids, and fatty acid salts. Examples of "salts" include ammonium salts, sodium salts, potassium salts, and tetramethylammonium salts.

Examples of the cationic surfactant include alkylpyridium-based surfactants.

Examples of the amphoteric surfactant include betaine type surfactants, amino acid type surfactants, imidazoline type surfactants, and amine oxide type surfactants.

These surfactants are generally commercially available. The surfactant may be used alone or in combination of two or more kinds thereof.

In a case where the aqueous cleaning liquid of the present embodiment contains the surfactant, the content of the surfactant is not particularly limited, but is, for example, preferably in a range of 0.0001% to 5% by mass, more preferably in a range of 0.001% to 3% by mass, still more preferably in a range of 0.002% to 1% by mass, and particularly preferably in a range of 0.002% to 0.2% by mass with respect to the total mass of the aqueous cleaning liquid. In a case where the content of the surfactant is in the above-described preferable ranges, bubbles generated by the foaming agent are likely to be dense.

The aqueous cleaning liquid of the present embodiment may not contain one or more selected from the group consisting of a nonionic surfactant, an anionic surfactant, a cationic surfactant, and an amphoteric surfactant, and may not contain one or more of the compounds exemplified as these surfactants. The aqueous cleaning liquid of the present embodiment may not contain a surfactant.

<<pH Adjusting Agent>>

The aqueous cleaning liquid of the present embodiment may contain a pH adjusting agent other than the acid components as long as the effects of the present invention are not impaired. Examples of the pH adjusting agent include a basic compound. The basic compound may be an organic basic compound or an inorganic basic compound.

Examples of the inorganic basic compound include inorganic compounds containing alkali metals or alkaline earth metals and salts thereof. Examples thereof include lithium hydroxide, sodium hydroxide, potassium hydroxide, rubidium hydroxide, and cesium hydroxide.

Examples of the organic basic compound include a quaternary ammonium salt and alkylamine (such as trimethylamine or triethylamine). Specific examples of the quaternary ammonium salt include tetramethylammonium hydroxide (TMAH), bis(2-hydroxyethyl)dimethylammonium hydroxide, tetraethylammonium hydroxide (TEAH), tetrapropylammonium hydroxide, tetrabutylammonium hydroxide, methyltriethylammonium hydroxide, trimethyl(hydroxyethyl)ammonium hydroxide, and triethyl(hydroxyethyl)ammonium hydroxide.

The pH adjusting agent may be used alone or in combination of two or more kinds thereof.

The aqueous cleaning liquid of the present embodiment may not contain a pH adjusting agent other than the acid components, and may not contain one or more of the pH adjusting agents described above.

<<Buffer>>

The aqueous cleaning liquid of the present embodiment may contain a buffer. The buffer is a compound having an action of suppressing a change in the pH of a solution.

The buffer is not particularly limited as long as it is a compound having a pH buffering ability. As the buffer, for example, a compound with a pKa of 6 to 11 can be used.

Examples of the buffer include a Good's buffer. Example of the Good's buffer include 2-cyclohexylaminoethanesulfonic acid (CHES), 3-cyclohexylaminopropanesulfonic acid (CAPS), N-tris(hydroxymethyl)methyl-3-aminopropanesulfonic acid (TAPS), 4-(cyclohexylamino)-1-butanesulfonic acid (CABS), tricine, bicine, 2-morpholinoethanesulfonic acid monohydrate (IVIES), bis(2-hydroxyethyl)aminotris(hydroxymethyl)methane (Bis-Tris), N-(2-acetamido)iminodiacetic acid (ADA), piperazine-1,4-bis(2-ethanesulfonic acid) (PIPES), N-(2-acetamido)-2-aminoethanesulfonic acid (ACES), 2-hydroxy-3-morpholinopropanesulfonic acid (MOPSO), N,N-bis(2-hydroxyethyl)-2-aminoethanesulfonic acid (BES), 3-morpholinopropanesulfonic acid (MOPS), N-tris(hydroxymethyl)methyl-2-aminoethanesulfonic acid (TES), 2-[4-(2-hydroxyethyl)-1-piperazinyl]ethanesulfonic acid (HEPES), 3-[N-tris(hydroxymethyl)methylamino]-2-hydroxypropanesulfonic acid (TAPSO), piperazine-1,4-bis(2-hydroxypropanesulfonic acid) (POPSO), 4-(2-hydroxyethyl)piperazine-1-(2-hydroxypropane-3-sulfonic acid) (HEPSO), and 4-(2-hydroxyethyl)-1-piperazinepropanesulfonic acid (EPPS).

The buffer may be used alone or in combination of two or more kinds thereof.

In a case where the aqueous cleaning liquid of the present embodiment contains the buffer, the content of the buffer is not particularly limited, but may be in a range of 0.001% by mass to 10% by mass, and is preferably in a range of 0.005% by mass to 5% by mass, more preferably in a range of 0.01% by mass to 1% by mass, and particularly preferably in a range of 0.05% by mass to 0.5% by mass or in a range of 0.05% by mass to 0.3% by mass with respect to the total mass of the aqueous cleaning liquid.

The aqueous cleaning liquid of the present embodiment may not contain the buffer, and may not contain one or more of the compounds described as the specific examples of the buffer.

<<Organic Solvent>>

The aqueous cleaning liquid of the present embodiment may contain an organic solvent within a range where the effects of the present invention are not impaired. The organic solvent is preferably a water-soluble organic solvent. Examples of the water-soluble organic solvent include alcohols (for example, isopropanol, ethanol, ethylene glycol, propylene glycol, glycerin, 1,3-propanediol, 1,3-butanediol, 1,4-butanediol, diethylene glycol, dipropylene glycol, furfuryl alcohol, and 2-methyl-2,4-pentanediol), dimethyl sulfoxide, and ethers (for example, ethylene glycol dimethyl ether, diethylene glycol dimethyl ether, triethylene glycol dimethyl ether, tetraethylene glycol dimethyl ether, and propylene glycol dimethyl ether).

The water-soluble organic solvent may be used alone or in combination of two or more kinds thereof.

In a case where the aqueous cleaning liquid of the present embodiment contains the water-soluble organic solvent, the content of the water-soluble organic solvent is preferably 50% by mass or less, more preferably 30% by mass or less, and still more preferably 20% by mass or less with respect to the total amount of water and the water-soluble organic solvent.

The aqueous cleaning liquid of the present embodiment may not contain an organic solvent or a water-soluble organic solvent, and may not contain one or more of the compounds described as the specific examples of the water-soluble organic solvent.

<<Impurities and the Like>>

The aqueous cleaning liquid of the present embodiment may contain metal impurities having metal atoms such as a Fe atom, a Cr atom, a Ni atom, a Zn atom, a Ca atom, and a Pb atom. The total content of the metal atoms in the aqueous cleaning liquid of the present embodiment is preferably 100 ppt by mass or less with respect to the total mass of the aqueous cleaning liquid. The lower limit value of the total content of the metal atoms is preferably as low as possible, but may be, for example, 0.001 ppt by mass or greater. The total content of the metal atoms may be, for example, 0.001 ppt by mass to 100 ppt by mass. By setting the total content of the metal atoms to less than or equal to the preferable upper limit value, the defect suppressing properties and the residue suppressing properties of the cleaning liquid are improved. It is considered that in a case where the total content of the metal atoms is set to greater than or equal to the preferable lower limit value, the metal atoms are less likely to be released in the system and less likely to adversely affect a production yield of the entire object to be cleaned. The content of the metal impurities can be adjusted, for example, by a purification treatment such as filtering. The purification treatment such as filtering may be performed on a part or all of the raw materials before preparation of the cleaning liquid or after preparation of the aqueous cleaning liquid.

The aqueous cleaning liquid of the present embodiment may contain, for example, impurities derived from an organic substance (organic impurities). The total content of the organic impurities in the aqueous cleaning liquid of the present embodiment is preferably 5,000 ppm by mass or less. The lower limit of the content of the organic impurities is preferably as low as possible, and the lower limit may be, for example, equal to or greater than 0.1 ppm by mass. The total content of the organic impurities is, for example, 0.1 ppm by mass to 5,000 ppm by mass.

The aqueous cleaning liquid of the present embodiment may include, for example, objects to be counted having a size that can be counted by a light scattering type in-liquid particle counter. The size of the object to be counted is, for example, 0.04 μm or greater. The number of the objects to be counted in the aqueous cleaning liquid of the present embodiment is, for example, 1,000 or less per mL of the aqueous cleaning liquid, and the lower limit value is, for example, 1 or greater. It is considered that in a case where the number of the objects to be counted in the aqueous cleaning liquid is in the above-described range, the metal corrosion suppressing effect of the aqueous cleaning liquid is improved.

The organic impurities and/or the objects to be counted may be added to the cleaning liquid, or may be inevitably mixed into the cleaning liquid in a step of producing the aqueous cleaning liquid. Examples of a case where organic impurities and/or the objects to be counted are inevitably mixed in a step of producing the aqueous cleaning liquid include a case where raw materials (for example, an organic solvent) used for the production of the aqueous cleaning liquid contain organic impurities and a case where organic impurities are mixed (for example, contamination) from the external environment in a step of producing the aqueous cleaning liquid, but the present invention is not limited thereto.

In a case where the objects to be counted are added to the aqueous cleaning liquid, the existence ratio may be adjusted for each specific size in consideration of the surface roughness and the like of a cleaning target.

<pH>

The pH of the aqueous cleaning liquid of the present embodiment is preferably in a range of 2 to 9, more preferably in a range of 3 to 8, and still more preferably in a range of 4 to 7.

In a case where the pH of the aqueous cleaning liquid is in the above-described preferable ranges, both the cleaning properties and the anticorrosion properties are easily achieved.

The aqueous cleaning liquid of the present embodiment may not contain one or more compounds selected from C4 to C13 alkyl phosphonic acid, C4 to C13 alkyl phosphonic acid ester, C4 to C13 alkyl phosphoric acid, and salts thereof.

Since the aqueous cleaning liquid according to the present embodiment contains hydrofluoric acid as an acid component, the cleaning properties are satisfactory. In general, a cleaning liquid containing hydrofluoric acid has excellent cleaning properties, but the anticorrosion properties thereof are likely to be degraded.

The aqueous cleaning liquid according to the present embodiment further contains tetradecylphosphonic acid. In general, tetradecylphosphonic acid is difficult to dissolve in an aqueous cleaning liquid. However, as a result of the examination conducted by the present inventors, it was found that in a case where tetradecylphosphonic acid is added in an amount that enables dissolution in an aqueous cleaning liquid containing hydrofluoric acid, the anticorrosion properties are improved while the cleaning properties are maintained.

(Method of Cleaning Electronic Device)

A method of cleaning an electronic device according to the present embodiment includes a step of bringing the aqueous cleaning liquid into contact with an electronic device.

Typically, dry etching residues can be removed by bringing the aqueous cleaning liquid into contact with an electronic device (for example, a semiconductor device) in a wet etching step (or steps before and after the wet etching step).

As the contact method, for example, the aqueous cleaning liquid is accommodated in a cleaning container, an electronic device to be cleaned is immersed in the aqueous cleaning liquid to remove dry etching residues, and thus the electronic device can be cleaned. Alternatively, dry etching residues are removed by treating the electronic device using a sheet type cleaning method, and thus the electronic device can be cleaned. The aqueous cleaning liquid is suitably used as an etchant as well as a dry etching residue removing liquid (cleaning liquid). Further, the aqueous cleaning liquid can also be used as a cleaning liquid for cleaning an electronic device after a chemical-mechanical polishing (CMP) step.

The temperature at which the aqueous cleaning liquid is used is typically in a range of 10° C. to 80° C., preferably in a range of 15° C. to 70° C., more preferably in a range of 20° C. to 65° C., and particularly preferably in a range of 20° C. to 60° C. The temperature can be appropriately selected depending on the cleaning conditions and the electronic device (for example, a semiconductor device) to be used. The time during which the aqueous cleaning liquid is used is typically in a range of 0.2 to 60 minutes. The time can be appropriately selected depending on the cleaning conditions and the electronic device (for example, a semiconductor device) to be used. As a rinse liquid used after the aqueous cleaning liquid is used, an organic solvent, water, carbonated water, or ammonia water can be used.

Examples of the electronic device serving as a cleaning target and a production target that can be suitably used in the present embodiment include a semiconductor device and a display device, and an intermediate product after the dry etching step is typically used as a target to be cleaned. Examples of the semiconductor device and the display device include substrate materials such as silicon, amorphous silicon, polysilicon, and glass, insulating materials such as silicon oxide, silicon nitride, silicon carbide, and derivatives thereof, materials such as cobalt, cobalt alloys, tungsten, and titanium-tungsten, compound semiconductors such as gallium-arsenic, gallium-phosphorus, indium-phosphorus, indium-gallium-arsenic, and indium-aluminum-arsenic, and oxide semiconductors such as chromium oxide. Particularly preferred examples of the electronic device serving as a cleaning target in the present embodiment include cobalt or a cobalt alloy wiring material, a zirconia-based hard mask, and an element formed of a low dielectric constant interlayer insulating film.

EXAMPLES

Hereinafter, the present invention will be described in more detail based on examples, but the present invention is not limited to these examples.

<Preparation (1) of Aqueous Cleaning Liquid>

Examples 1 to 18 and Comparative Examples 1 to 4

Each component listed in Table 1 was mixed, and acetic acid and ammonium hydroxide were blended to have the pH listed in Table 1, thereby preparing an aqueous cleaning liquid of each example.

TABLE 1

| | HF (ppm) | TDPA (ppm) | Water | pH | Etching rate (relative value) |
|---|---|---|---|---|---|
| Comparative Example 1 | 1500 | — | Remaining portion | 4 | 100 |
| Example 1 | 1500 | 1 | Remaining portion | 4 | 17 |
| Example 2 | 1500 | 2 | Remaining portion | 4 | 13 |
| Example 3 | 1500 | 3 | Remaining portion | 4 | 9 |
| Example 4 | 1500 | 4 | Remaining portion | 4 | 8 |
| Comparative Example 2 | 1500 | — | Remaining portion | 5 | 73 |
| Example 5 | 1500 | 1 | Remaining portion | 5 | 7 |
| Example 6 | 1500 | 2 | Remaining portion | 5 | 6 |
| Example 7 | 1500 | 3 | Remaining portion | 5 | 3 |
| Example 8 | 1500 | 4 | Remaining portion | 5 | 1 |
| Comparative Example 3 | 1500 | — | Remaining portion | 6 | 59 |
| Example 9 | 1500 | 1 | Remaining portion | 6 | 4 |
| Example 10 | 1500 | 2 | Remaining portion | 6 | 2 |
| Example 11 | 1500 | 3 | Remaining portion | 6 | 1 |
| Example 12 | 1500 | 4 | Remaining portion | 6 | 0 |
| Example 13 | 1500 | 5 | Remaining portion | 6 | 0 |
| Comparative Example 4 | 1500 | — | Remaining portion | 7 | 45 |
| Example 14 | 1500 | 1 | Remaining portion | 7 | 2 |
| Example 15 | 1500 | 2 | Remaining portion | 7 | 1 |
| Example 16 | 1500 | 3 | Remaining portion | 7 | 1 |
| Example 17 | 1500 | 4 | Remaining portion | 7 | 0 |
| Example 18 | 1500 | 5 | Remaining portion | 7 | 0 |

(Evaluation of Metal Anticorrosion Properties)

A wafer with a cobalt film was immersed in an aqueous cleaning liquid at 25° C. for 1 minute, and the etching rate was measured. The film thickness (nm) of each cobalt film before and after etching was measured with a fluorescence X-ray analyzer (manufactured by Rigaku Corporation), the etching rate (film thickness to be etched per unit time (1 second); nm/s) was calculated, the etching rate in a case of using the aqueous cleaning liquid of Comparative Example 1 was set to 100 as a relative value, and the metal anticorrosion properties of the aqueous cleaning liquid of each example was evaluated. The results are listed in Table 1.

As shown in the results listed in Table 1, it was confirmed that the aqueous cleaning liquids of Examples 1 to 18 had satisfactory metal anticorrosion properties as compared with the aqueous cleaning liquids of Comparative Examples 1 to 4.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

What is claimed is:

1. An aqueous cleaning liquid comprising hydrofluoric acid and tetradecylphosphonic acid.

2. The aqueous cleaning liquid according to claim 1, wherein the aqueous cleaning liquid has a pH of 4 to 7.

3. The aqueous cleaning liquid according to claim 1, wherein a content of the tetradecylphosphonic acid is ppm or less with respect to a total amount of the aqueous cleaning liquid.

4. A method of cleaning an electronic device, comprising contacting the electronic device with the aqueous cleaning liquid according to claim 1.

* * * * *